Sept. 17, 1968  J. B. SYNNOTT III  3,401,773
METHOD AND APPARATUS FOR CEMENT LOGGING OF CASED BOREHOLES
Original Filed March 15, 1966  2 Sheets-Sheet 1

INVENTOR.
JUDSON BRUCE SYNNOTT, III
BY
his ATTORNEYS.

United States Patent Office 3,401,773
Patented Sept. 17, 1968

3,401,773
METHOD AND APPARATUS FOR CEMENT LOGGING OF CASED BOREHOLES
Judson Bruce Synnott III, Atlantic Highlands, N.J., assignor, by mesne assignments, to Schlumberger Technology Surveying Corp., Houston, Tex., a corporation of Texas
Continuation of application Ser. No. 534,392, Mar. 15, 1966. This application Dec. 4, 1967, Ser. No. 687,921
6 Claims. (Cl. 181—.5)

ABSTRACT OF THE DISCLOSURE

A method and apparatus for obtaining data relative to existence and thickness of the cement annulus between a well casing and surrounding formations are described. Acoustic energy impulses are transmitted from a transmitter transducer to a receiver transducer spaced along the borehole and the nature of the received signal gives the desired information. The amplitude of the initial portion of the received signal indicates whether or not cement is bonded to the casing and the energy content of a later arriving portion of the received signal, obtained by integrating that portion of the signal, indicates the presence or absence of cement behind the casing, irrespective of the condition of the bond. Correlation of the two indications provides a complete definition of the cement annulus.

---

This application is a streamlined continuation of Ser. No. 534,392, filed Mar. 15, 1966, and now abandoned.

The present invention relates to methods and apparatus for logging cased boreholes and more particularly, to methods and apparatus for obtaining information relative to the existence and quality of the cement annulus surrounding the casing in a borehole.

After a borehole drilled in the earth formation has been found to have penetrated oil bearing strata, the hole is generally cased with lengths of pipe, usually of steel, suitably coupled together, through which the oil is recovered from the deposits. The casing is then secured to the surrounding earth formations by cement, which is pumped in slurry form into the annulus between the casing and the surrounding formations and then hardens to retain the casing rigidly in position. Perhaps of even greater importance is the fact that the cement also seals off the oil bearing strata from the other formations so that when the casing and cement are subsequently perforated, the oil enters directly into the casing and migration of fluids between adjacent formations is prevented.

Therefore, it is important to the proper completion of a well to have precise information concerning the nature of the cement annulus surrounding the casing. In copending applications Ser. Nos. 4,635 and 18,765, filed Jan. 26, 1960, and Mar. 30, 1960, respectively, in the names of Majani and Rushton, now Patent Nos. 3,291,247 and 3,291,248, both granted Dec. 13, 1966, and copending application Ser. No. 370,763, filed May 26, 1964, in the name of John T. Dewan, now Patent No. 3,292,146, granted Dec. 13, 1966, all assigned to the present assignee or an affiliated company, there are disclosed techniques and apparatus for performing an operation commonly known as cement bond logging. In accordance with these disclosures, the acoustic properties of the well casing are logged and the resultant record examined to determine the presence or absence of the bonding of the annulus of cement to the well casing along the logged length of borehole. This procedure then, gives the operator information as to whether at any given point along the borehole, cement is firmly bonded to the casing.

The foregoing techniques, however, do not distinguish between areas in which cement is presented behind the casing but not bonded to it, and those where no cement is present at all. In the former case, repair of the cement annulus may not be necessary since although not bonded to the casing at the point in question, the cement annulus may still properly seal the formations.

It is obvious therefore, that information as to both the bonding of cement to the casing and the presence or absence of cement behind the casing is highly desirable, and it is the primary object of the present invention to provide techniques and apparatus for providing such information.

Another object of the present invention is to provide a simple yet reliable technique for concurrently determining both the condition of the bond of cement to the casing and the presence or absence of cement between the casing and the surrounding formations at any point along the borehole.

A further object of the invention is to provide a simple logging apparatus for obtaining both of the aforesaid indications concurrently from a single receiver signal.

Briefly, in accordance with the present invention, an acoustic impulse is generated at a point along the cased borehole and the energy thereof transmitted at least in part along the casing. An acoustic receiver, spaced a fixed distance from the transmitter along the axis of the borehole, intercepts the energy transmitted along the casing and produces a corresponding electrical signal consisting of a plurality of alternations. To obtain an indication of the presence or absence of cement behind the casing between the transmitter and receiver, the electrical signal from the receiver is passed through a gate which is operative to select a portion thereof for further processing. Specifically, the gate is timed to select that portion of the casing signal affected by the presence or absence of cement behind the casing, but not to pass the initial portion of the casing signal representative of direct compressional wave transmission along the casing. The selected signal portion is applied to circuitry, such as an integrator, which provides a measurement of its total energy. This value is indicative of the presence or absence of cement behind the casing in the region under investigation.

At the same time, the receiver output signal is supplied to conventional cement bond logging circuitry, such as described in the aforementioned applications, in which the first significant alternation or amplitude excursion of the received signal is employed to provide an indication of the presence or absence of bonding of cement to the casing in the region under consideration.

As the transmitter and receiver are moved through the borehole, the transmitter is periodically pulsed, thereby producing both indications concurrently at each of a number of depth intervals. The two indications are then simultaneously recorded as a function of depth.

A comparison of both indications at any given depth will reveal the existence of one of the following possible conditions: (1) cement is present behind the casing and is securely bonded thereto, or (2) cement is not behind the casing (and therefore not bonded thereto), or (3) cement is present behind the casing but not bonded thereto.

The foregoing and other objects, features and advantages of the present invention will become more apparent from the following more detailed description thereof, taken in conjunction with the accompanying drawings in which.

Figures 1, 2:
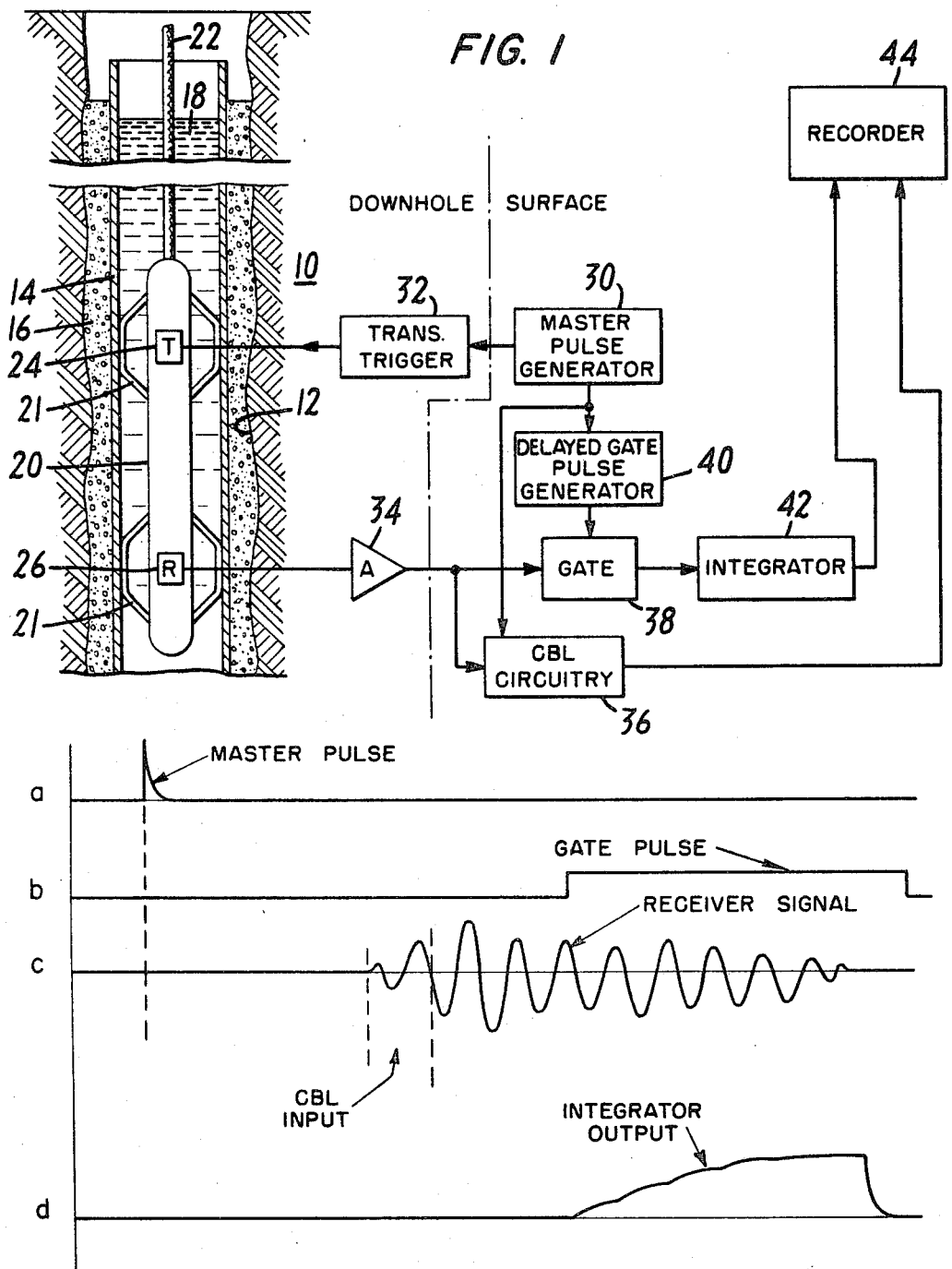
FIGURE 1 is a schematic representation of the logging system according to the invention illustrating the logging tool in position in the borehole, with the downhole and surface circuitry shown in block form.
FIGURE 2 is a wave form diagram useful in explaining the operation of the system of FIGURE 1.

Referring now to FIGURE 1, a borehole 12 is drilled in the earth formations 10 and a casing 14, such as of steel, placed along the borehole. As described above, the cement slurry is then pumped into the annulus between the casing and the surrounding formations and subsequently hardens to form a cement annulus 16. In FIGURE 1, the cement annulus is seen to be completely bonded to the casing 14 and completely filling the annular space between the casing and the surrounding formations 10. The casing 14 is filled with a fluid 18.

A logging tool 20 of a generally cylindrical shape is suspended in the casing 14 by means of the conventional cable 22. The latter not only provides support for the tool but also carries the electrical conductors for coupling electrical power and logging signals between the tool and the surface equipment. A suitable winch (not shown) is provided at the surface for lowering and raising the logging tool 20 in the borehole. The tool 20 is provided with centralizers 21 for maintaining it concentrically disposed within the casing.

Mounted in the tool 20 in spaced relationship to one another are an acoustic transmitting transducer 24 and a corresponding receiving transducer 26. Each of these may be of any convenient form capable, in the case of the transmitter, of converting an electrical trigger pulse into a burst of acoustic energy and, in the case of the receiver, capable of converting an intercepted acoustic signal into a corresponding electrical wave form.

To the right of the borehole cross section shown in FIGURE 1 is a block diagram of the downhole and surface electrical circuitry of the system. It will be understood, of course, that the downhole circuitry is mounted in the logging tool 20 itself and connected via cable 22 to the surface equipment located above.

The electrical circuitry includes a master pulse generator 30 which serves as a timing source for the entire system. The pulse generator 30 provides periodic output pulses to a transmitter triggering circuit 32 in the tool which serves to actuate the acoustic transmitter 24. Thus, the transmitter emits periodic bursts of acoutsic energy as the tool is moved through the well bore.

The output of the acoustic receiver 26, in the form of an electrical signal, is fed through an amplifier 34 to the cement bond logging (CBL) circuitry 36, such as of the type disclosed in the aforementioned copending applications. For example, the CBL circuitry 36 of the present invention would comprise the circuitry forming elements 26, 27, 28 and 35 in FIGURE 2 of the aforementioned Patent No. 3,292,146. The master pulse generator 30 of the present invention corresponds to the keyer 25 of the patent and would provide the input to the delay 26. Similarly the amplifier 34 hereof is equivalent to the element 29 forming part of the block 28 of the patent and would be connected to the remainder of the circuitry in the same manner.

In the Majani et al. Patent No. 3,291,247, the keyer 25 (FIGS. 1 and 2) corresponds to the present master pulse generator 30 and the manner in which elements 27, 28 and 31 plus associated filter circuitry (FIG. 1) or elements 27', 28', 38, 41 and 42 (FIG. 2) would be coupled to the present circuitry is evident. The output of the amplifier 34 is also coupled through a gate 38 to an integrating circuit 42. The outputs of the CBL circuitry 36 and the integrator 42 are fed to a dual track recorder 44 which is driven in synchronism with the movement of the logging tool through the borehole, in known manner.

The gate 38 is actuated by a delayed gate pulse generator 40 of any convenient form which in turn is synchronized with the master pulse generator 30. Turning to FIGURE 2, the gate pulse output of the pulse generator 40 is indicated in curve b and is seen to commence well after the initial arrival of the acoustic energy at the receiver 26. Thus, the initial portion of the received signal is not passed through the gate.

The portion of the received signal passed by the gate 38 is fed to an integrator 42 which produces an output indication corresponding to the total energy contained n the signal supplied to it. As seen in curve d of FIGURE 2, the output of the integrator builds up with each cycle of the input signal but, since this process occurs so rapidly with respect to the movement of the recorder, the indication produced thereon is effectively the total energy value.

As described in the aforementioned copending applications, the nature of the bond between the cement surrounding the casing and the casing may be determined by the attenuation effects on the initial portion of the received signal. Since the casing provides a path of known, constant velocity for acoustic energy, it is possible to accurately select the desired portion of the receiver signal and examine its amplitude characteristics in accordance with the techniques and apparatus described in the above-noted copending applications, which are incorporated by reference herein. Thus, if the cement is bonded to the casing in the area under investigation, the acoustic energy travelling along the casing will be greatly attenuated and this fact can be determined by examining the amplitude of the first significant amplitude excursion of the receiver signal. On the other hand, if cement is not bonded to the casing, the acoustic energy travels along the casing substantially without impediment and little attenuation results. In this case, the amplitude of the first arrival of the acoustic signal at the receiver is relatively high. It is therefore possible to distinguish between conditions of bonding and no bonding of cement to the casing as the tool 20 moves through the borehole and the CBL circuitry 36 provides such indications.

Although accurately indicating the presence or absence of a bond between cement and the casing along the borehole, the CBL circuitry is unable to distinguish between the mere absence of a bond (with cement present) and the absence of cement behind the casing at the point of investigation. The initial portion of the receiver signal, which represents the direct compressional wave transmission along the casing, is affected only by materials tightly bonded to the casing and even a slight separation between the cement and the casing will produce a "no bond" indication. It has been found that information concerning the presence or absence of cement behind the casing may be determined from the energy content of that portion of the signal received via the casing other than that representing direct compressional wave transmission along the casing. The later arriving portion of the received signal is affected by the presence and kind of material behind the casing, whether or not bonded to it. Although not yet definitely determined, it is believed that this portion of the received casing signal is indicative of a radial vibration of the casing which couples energy into the surrounding materials. Therefore, if cement is in contact with or near the casing, a relatively large amount of energy is coupled thereto and the energy in the casing is correspondingly reduced. Accordingly, the integrated output of the receiver signal would be relatively low. Conversely, if no cement is adjacent the casing, little energy is lost thereto and a large integrator output is indicative of this fact.

The output indications produced by the integrator 42 are simulaneously recorded with the output of the CBL circuitry as a function of depth to provide a pair of correlative logs. Thus, a low reading of the integrator coupled with a "bond" output of the CBL circuit would indicate the condition shown in FIGURE 3A, wherein cement fills the annulus between the casing and the formations and is bonded to the casing. A high reading from the integrator 42 coupled with a "no bond" indication from the circuitry 36 indicates the condition shown in FIGURE 3B, wherein a void 52 is present in the cement annulus.

Figure 3A:
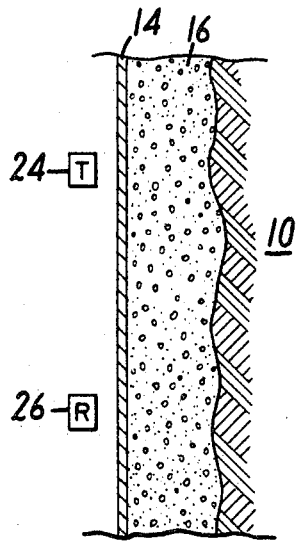
FIGURES 3A, 3B, and 3C are illustrative of the possible cement conditions that may be determined with the present invention.
Figure 3B:
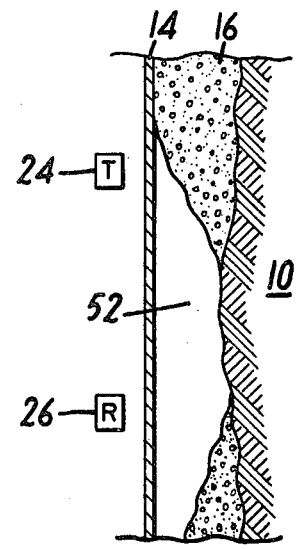
Figure 3C:
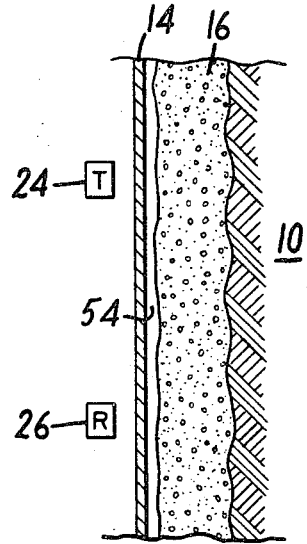

Finally, a low indication from the integrator 42 together with a "no bond" output from the CBL circuitry would result from the condition of FIGURE 3C, wherein cement is present but is not bonded to the casing 14. While a separation 54 between the cement in the casing may be present, the formations 10 are still properly sealed off by the cement 16 and repairs would not be necessary.

Although FIGURES 3A, 3B, and 3C represent extremes of the cement characteristics, the output of the integrator 42, i.e., the indication of the energy content of the received signal, may be interpreted to indicate not only the presence or absence of cement, but also the thickness of the cement layer.

Under conditions found in a typical cased borehole, it was determined that elimination of approximately the first four-tenths of the received signal eliminated the unwanted compressional wave transmission along the casing and provided a meaningful output indicating the presence or absence of cement around the casing. With a steel casing, this required a delay between the master pulse and the initiation of the gate pulse of approximately one millisecond. These parameters of course, will vary with the material of the casing and the character of the surrounding formations, and may be adjusted to suit the existing requirements.

Although a preferred embodiment of the invention has been shown and described hereinabove, it will be readily apparent that various modifications thereof may be made by those skilled in the art without departing from the spirit and scope of the invention. Accordingly, the invention is to be limited only as set forth in the appended claims.

I claim:
1. A method of determining characteristics of a cement annulus between a casing in a borehole and the surrounding earth formations, comprising the steps of generating a pulse of acoustic energy at a first point along said borehole and transmitting at least a portion of said energy along said casing, intercepting the acoustic energy transmitted along said casing at a second point along said borehole longitudinally spaced from said first point and producing an electrical signal representative thereof, said signal being composed of a plurality of alternations, deriving from a significant amplitude alternation of said signal an indication of the presence or absence of bonding of cement to the casing between said first and second points, measuring the energy of all of said electrical signal except the initial portion thereof representative of direct compressional wave transmission along said casing to provide an indication of the presence or absence of cement behind the casing between said first and second points, and recording both of said indications.

2. The method of claim 1 wherein the derivation of said bonding indication and the energy measurement are performed substantially concurrently.

3. The method of claim 1 wherein the initial portion of said electrical signal excluded from said energy measurement comprises approximately four-tenths of the duration of the entire electrical signal.

4. A method of determining characteristics of a cement annulus between a casing in a borehole and the surrounding earth formations, comprising the steps of periodically generating pulses of acoustic energy at respective first points at different depths along said borehole and transmitting at least a portion of the energy of each of said pulses along said casing, intercepting the respective pulses of acoustic energy transmitted along said casing at second points along said borehole longitudinally spaced respectively from said first points, and producing electrical signals representative thereof, each of said signals being composed of a plurality of alternations, deriving from the first significant amplitude alternation of each of said signals first indications of the presence or absence of bonding of cement to the casing between said respective first and second points, measuring the energy of each of said electrical signals except the initial portion thereof representative of direct compressional wave transmission along said casing to provide second indications of the presence or absence of cement behind the casing between said respective first and second points, and simultaneously recording said first and second indications as a function of depth in the borehole.

5. Apparatus for determining characteristics of a cement annulus between a casing in a borehole and the surrounding earth formations comprising, a logging tool adapted to be moved through said casing centrally thereof, acoustic transmitter and receiver means mounted on said tool and longitudinally spaced from each other, means for periodically actuating said transmitter to transmit acoustic energy along said casing as said tool moves through said borehole, said receiver means intercepting said casing energy and providing an electrical signal representative thereof, means coupled to said receiver and responsive to a significant half-cycle of said electrical signal to provide an indication of the presence or absence of bonding of cement to said casing between said transmitter and receiver means, means coupled to said receiver and responsive to all of said electrical signal except the initial portion thereof representative of direct compressional wave transmission along said casing to provide an indication of the presence or absence of cement behind the casing between said transmitter and receiver means, and means to record both of said indications as a function of position in said borehole.

6. Apparatus for determining characteristics of a cement annulus between a casing in a borehole and the surrounding earth formations comprising, a logging tool adapted to be moved through said casing, acoustic transmitter and receiver means mounted on said tool and longitudinally spaced from each other, means for periodically actuating said transmitter to transmit acoustic energy as said tool moves through said borehole, said receiver means intercepting at least a portion of said energy and providing an electrical signal representative thereof, means coupled to said receiver and responsive to a significant half-cycle of a part of said signal representing energy transmitted along said casing to provide an indication of the presence or absence of bonding of cement to said casing between said transmitter and receiver means, means coupled to said receiver and responsive to all of said electrical signal except the initial portion thereof representative of direct compressional wave transmission from said transmitter means to said receiver means to provide an indication of the presence or absence of cement behind the casing between said transmitter and receiver means, and means to record both of said indications as a function of position in said borehole.

References Cited

UNITED STATES PATENTS

| | | | |
|---|---|---|---|
| 2,207,281 | 7/1940 | Athy et al. | 181—5 |
| 2,905,258 | 9/1959 | Broding | 181—5 |
| 3,291,247 | 12/1966 | Majani et al. | 181—5 |
| 3,291,248 | 12/1966 | Majani et al. | 181—5 |
| 3,292,146 | 12/1966 | Dewan | 181—5 |
| 3,265,151 | 8/1966 | Anderson | 181—5 |
| 3,303,461 | 2/1967 | Edwards et al. | 340—18 |
| 3,314,498 | 4/1967 | Anderson et al. | 340—18 XR |
| 3,334,329 | 8/1967 | Fons et al. | 340—18 |

BENJAMIN A. BORCHELT, *Primary Examiner.*

J. FOX, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,401,773                      September 17, 1968

Judson Bruce Synnott III

It is certified that error appears in the above identified patent and that said Letters Patent are hereby corrected as shown below:

In the heading to the printed specification, lines 5 and 6, "Schlumberger Technology Surveying Corp." should read -- Schlumberger Technology Corporation --. Column 4, line 5, "n" should read -- in --.

Signed and sealed this 10th day of February 1970.

(SEAL)
Attest:

Edward M. Fletcher, Jr.                  WILLIAM E. SCHUYLER, JR.

Attesting Officer                          Commissioner of Patents